United States Patent
Derval et al.

(10) Patent No.: US 10,730,390 B2
(45) Date of Patent: Aug. 4, 2020

(54) DEVICE AND SYSTEM FOR CONTROLLING FUNCTIONS OF AN INDUSTRIAL OR ALL-TERRAIN VEHICLE

(71) Applicant: MANITOU BF, Ancenis (FR)

(72) Inventors: Laurent Derval, Ancenis (FR); Philippe Lebreton, Ancenis (FR)

(73) Assignee: MANITOU BF, Ancenis (FR)

( * ) Notice: Subject to any disclaimer, the term of this patent is extended or adjusted under 35 U.S.C. 154(b) by 218 days.

(21) Appl. No.: 15/526,898

(22) PCT Filed: Nov. 19, 2015

(86) PCT No.: PCT/FR2015/053137
§ 371 (c)(1),
(2) Date: May 15, 2017

(87) PCT Pub. No.: WO2016/079439
PCT Pub. Date: May 26, 2016

(65) Prior Publication Data
US 2017/0320392 A1    Nov. 9, 2017

(30) Foreign Application Priority Data

Nov. 19, 2014 (FR) .................................. 14 61191

(51) Int. Cl.
*B60K 37/06* (2006.01)
*B60H 1/00* (2006.01)
(Continued)

(52) U.S. Cl.
CPC ........... *B60K 37/06* (2013.01); *B60H 1/0065* (2013.01); *B60H 1/00985* (2013.01); *H01H 3/12* (2013.01);
(Continued)

(58) Field of Classification Search
USPC ........................................................ 701/36
See application file for complete search history.

(56) References Cited

U.S. PATENT DOCUMENTS 5,215,480 A    6/1993 Lesslie et al.
6,426,872 B1 *  7/2002 Sutton ................. B60R 11/0252
                                            361/679.41
(Continued)

FOREIGN PATENT DOCUMENTS

CA    2062004    9/1992
CN   104010864   8/2014
(Continued)

OTHER PUBLICATIONS

International Search Report dated Mar. 17, 2016.
(Continued)

*Primary Examiner* — Jean Paul Cass
(74) *Attorney, Agent, or Firm* — Ipsilon USA, LLP

(57) ABSTRACT

The invention relates to a system (10) for controlling industrial or all-terrain vehicle functions, which comprises data processing means (20), such as a computer, and a plurality of devices (10a-10g) for controlling industrial or all-terrain vehicle functions. The control devices are arranged in a network with the data processing means (20) according to a master-slave model, and each control device comprises at least one first control member (3a) sensitive to contact and connectors (2), a computing circuit (1) with at least one data processing unit (MC), a memory in which is stored a unique identifier associated with said control device, and at least one first control state visualization member (4a). The data processing means (20) are configured to transmit to each identified control device (10a-10g) a request to obtain a feedback of information from the associated processing unit.

11 Claims, 2 Drawing Sheets

(51) Int. Cl.
 *H01H 3/12* (2006.01)
 *H01H 9/18* (2006.01)
 *H01H 11/00* (2006.01)
 *H01H 13/70* (2006.01)
(52) U.S. Cl.
 CPC ........ *H01H 9/182* (2013.01); *H01H 11/0018* (2013.01); *H01H 13/7006* (2013.01); *B60K 2370/122* (2019.05); *B60K 2370/128* (2019.05); *B60K 2370/139* (2019.05); *B60K 2370/141* (2019.05); *B60K 2370/34* (2019.05); *B60K 2370/42* (2019.05); *B60K 2370/46* (2019.05); *B60K 2370/91* (2019.05); *B60Y 2200/15* (2013.01); *B60Y 2200/20* (2013.01); *B60Y 2200/41* (2013.01); *H01H 2011/0025* (2013.01); *H01H 2219/062* (2013.01); *H01H 2221/034* (2013.01); *H01H 2229/022* (2013.01)

(56) References Cited

U.S. PATENT DOCUMENTS 8,849,494 B1* 9/2014 Herbach .............. G05D 1/0297
 701/24
2002/0194476 A1* 12/2002 Lewis ................... H04L 9/3271
 713/169
2007/0012550 A1 1/2007 Wohlfart
2008/0027599 A1* 1/2008 Logan .................. G05D 1/0234
 701/23
2014/0229075 A1 8/2014 Lopez
2016/0066295 A1* 3/2016 Han ....................... G06F 3/013
 345/8

FOREIGN PATENT DOCUMENTS

| DE | 19953863 | 5/2000 |
|---|---|---|
| DE | 102010029141 | 11/2011 |
| DE | 102013015738 | 4/2014 |
| EP | 0884220 | 12/1998 |
| GB | 2428770 | 2/2007 |
| KR | 20110076533 | 7/2011 |

OTHER PUBLICATIONS

International Search Exam Report dated Nov. 7, 2016.
Notification of First Office First Chinese Office Action dated Aug. 27, 2018.

* cited by examiner

DEVICE AND SYSTEM FOR CONTROLLING FUNCTIONS OF AN INDUSTRIAL OR ALL-TERRAIN VEHICLE

FIELD OF THE INVENTION

The present invention concerns in general the control of functions of industrial or all-terrain vehicles.

The invention relates to a system for controlling functions of an industrial or all-terrain vehicle comprising a plurality of devices for controlling functions of an industrial or all-terrain vehicle.

The invention is particularly useful for the controlling of functions of an industrial or all-terrain handling trolley.

PRIOR ART

In the prior art there are known systems for controlling functions of an industrial or all-terrain vehicle comprising control devices which are present in the form of toggle switches and which are generally satisfactory.

However, these toggle switches need to have connectors in expectation of the electrical harnesses in specific locations in case they are connected.

Yet at times these connectors are prearranged unnecessarily on the electrical harnesses if the corresponding option is not required or used by the customer.

The number and cost of such unused connectors complicates the manufacture and increases the cost of the means of controlling functions of an industrial or all-terrain vehicle.

Furthermore, these toggle switches, which are relatively costly and have a relatively large size, need to be placed in locations specified by the initial design of the industrial or all-terrain vehicle, which rules out any rearrangement during the installation.

In the prior art the documents EP1749689 (D1), WO2013059200 (D2) and DE202005011033 (D3) are known which propose control panels. However, these control panels are not modulable, or are only such with difficulty, and/or they are not sufficiently adaptable in keeping with the options chosen by the customer. In particular, the adding or the rearranging of functions would be complicated and a source of errors.

The purpose of the present invention is to propose a control system which can mitigate some or all of the problems mentioned above.

A first purpose of the invention is to significantly reduce the risks of error in the installation of devices for controlling functions of an industrial or all-terrain vehicle by providing a fast installation not requiring any particular order or location.

A second purpose of the invention is to provide a simplification in the electrical harness for controlling functions of an industrial or all-terrain vehicle while lowering the cost involved in the design and installation without rearrangement of the industrial or all-terrain vehicle of the prior art.

A third purpose of the invention is to easily add a control device option chosen by the customer to a cabin location defined by the customer in order to provide said customer with greater comfort of use and better ergonomics adapted to its use.

A fourth purpose of the invention is to provide a compact control device as compared to the large size of the classical toggle buttons by also modifying the general appearance of the cabin and displaying the logo or brand of the maker of the industrial or all-terrain vehicle.

A fifth purpose of the invention is to improve the controlling of functions of an industrial or all-terrain vehicle by providing an open and adaptable system while keeping some or all of the advantages of the devices of the prior art.

SUMMARY OF THE INVENTION

Accordingly, the purpose of the invention is a system for controlling functions of an industrial or all-terrain vehicle, characterized in that said system comprises:
  means of data processing, such as a computer,
  a plurality of devices for controlling industrial or all-terrain vehicle functions,
said control devices being arranged in a network with said data processing means according to a master-slave model, and in that each device for controlling industrial or all-terrain vehicle functions comprises in combination:
  at least a first control member sensitive to contact and connectors,
  a computing circuit with at least one data processing unit, such as a microcontroller, and a memory in which is stored a unique identifier associated with said control device, and
  at least a first control state visualization member,
and in that said data processing means are configured to transmit to each control device identified by the unique identifier of said control device a request to obtain a feedback of information from the associated processing unit.

The installation in a network and the polling by the master processing means of the slave control devices makes possible no longer being subject to a fixed arrangement of the control devices inside the vehicle. In fact, depending on the preferences or options chosen by the user, a control device can be replaced with or interchanged for another or be added without this disrupting the control system, since the processing means communicate with each control device with the aid of its unique identifier.

According to one particular aspect, the processing unit of each control device is able to determine the control state of the control member or members of the corresponding control device and is able to determine the state of said control state visualization member or members of said control device.

According to another particular characteristic, said data processing means are configured to transmit said request one by one to each control device.

According to another particular characteristic, said data processing means are configured to transmit said request to each device in a continuous cycle.

According to another particular characteristic, the control devices are replaceable and/or are able to be exchanged for each other. Thus, the devices are physically interchangeable without this affecting the communication between the master, formed by the processing means, and the slaves, formed by the control devices, or more precisely the processing units of the control devices.

According to another particular characteristic, said system comprises links interconnecting the control devices in order to form a control device chain, and connecting said data processing means to said control device chain.

Advantageously, the links between the devices, and preferably also between the processing means and the device connected to said processing means, are interchangeable so that the order of the devices can be easily modified.

According to another particular characteristic, said feedback information comprises the control state of said at least one first control member sensitive to contact and/or the consistency of the state of said at least one first control state visualization member with the control state of said at least one first control member sensitive to contact.

According to another particular characteristic, said feedback information comprises the state of said at least one first control state visualization member.

According to other particular characteristics of the invention:

- The computing circuit of each control device comprises on the same support at least said processing unit, the connectors, the first control member sensitive to contact, a second control member sensitive to contact, the first control state visualization member and a second control state visualization member.
- Each control device comprises a front face with a rigid frame bounding off at least one flexible support zone.
- Each control device comprises a first flexible support zone having a pictogram with backlighting and a translucent window placed on top of it with the first control state visualization member, to allow the operator to know the control state of the control member sensitive to contact. The invention thus enables a better management of the stock of elements making up the device for controlling industrial or all-terrain vehicle functions by electing to mark the front faces with pictograms depending on the effective commands, and then to assemble the corresponding front faces to form the control devices according to the invention before programming them with their unique identifier.
- Each control device furthermore comprises a second flexible support zone having a pictogram with backlighting and a translucent window placed on top of it with a second control state visualization member, to allow the operator to know the control state of a second control state visualization member sensitive to contact.
- Each control device comprises a mounting box for the computing circuit and a front face and the box comprises openings for the connectors to pass through.
- Each control device is fabricated by mounting of the computing circuit and a front face in a mounting box and by tight assembly, for example, by ultrasound welding.
- The data processing unit of each control device comprising at least one printed circuit, said links connect said printed circuits of the control devices each control device, and each one has terminations comprising connectors fitted to the connectors of the printed circuits of the control devices.

BRIEF DESCRIPTION OF THE DRAWINGS

The invention will be better understood thanks to the following description given as a nonlimiting example with reference to the appended drawings, in which.

DETAILED DESCRIPTION

Figure 1:
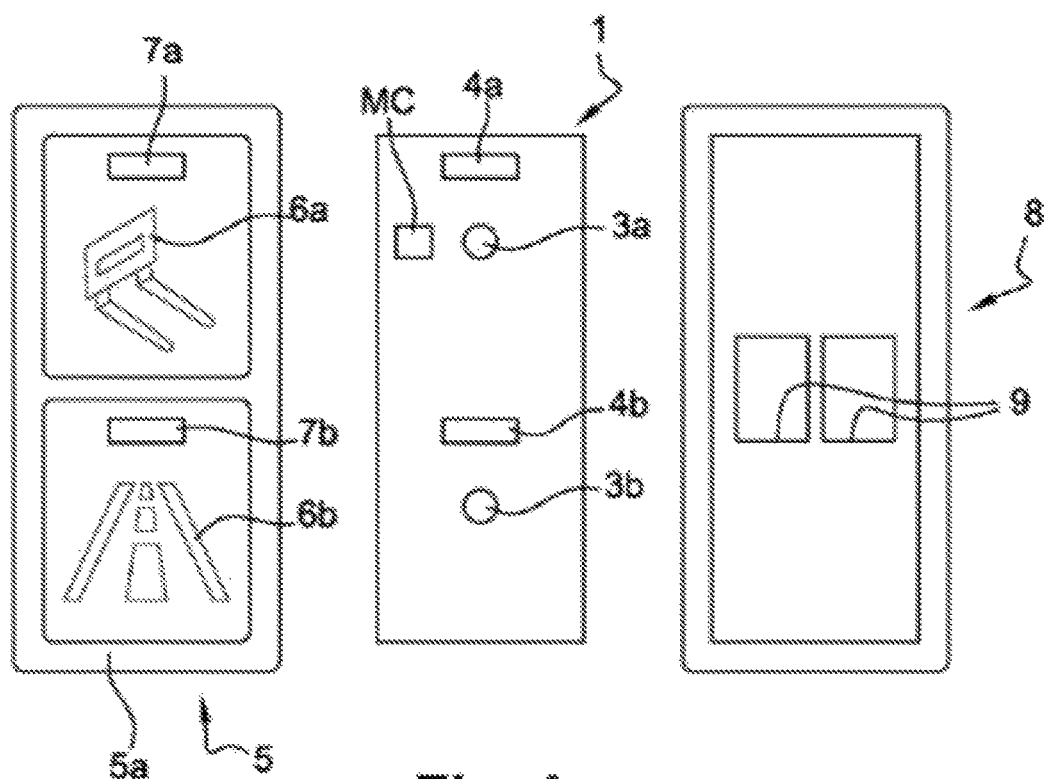
FIG. 1 shows schematically front views of elements making up a device for controlling industrial or all-terrain vehicle functions according to the invention, prior to assembly.

The concept of the invention is described more completely below with reference to the enclosed drawings, in which embodiments of the concept of the invention are shown. In the drawings, the size and the relative sizes of the elements of the control system may be exaggerated for purposes of clarity. Similar numbers make reference to similar elements in all the drawings. However, this concept of the invention can be implemented in many different forms and should not be interpreted as being limited to the embodiments explained here. Instead, these embodiments are proposed so that this description is complete, and they communicate the scope of the concept of the invention to those skilled in the art. Consequently, the scope of the invention is defined by the appended claims. The following embodiments are discussed, for reasons of simplification, in relation to the terminology and structure of a system for controlling vehicle functions.

A reference throughout the specification to "an embodiment" means that a functionality, a structure, or a particular characteristic described in relation to one embodiment is included in at least one embodiment of the present invention. Thus, the appearance of the expression "in an embodiment" at different locations throughout the description does not necessarily make reference to the same embodiment. Furthermore, the functionalities, the structures, or the particular characteristics may be combined in any suitable manner in one or more embodiments.

Figure 2:
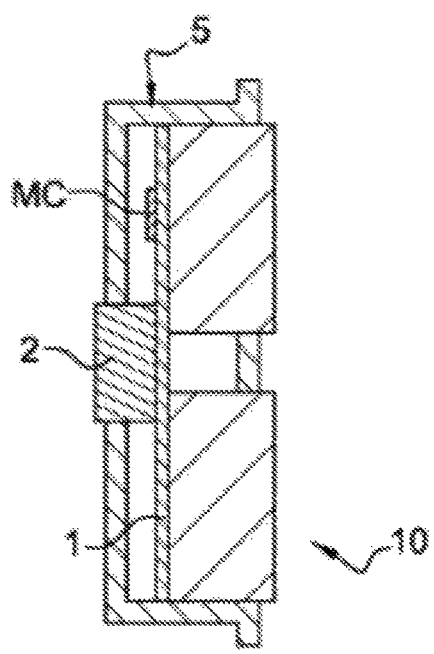
FIG. 2 shows schematically a cross sectional view of a device for controlling industrial or all-terrain vehicle functions according to the invention, after assembly.

In reference to FIGS. 1 and 2, a computing circuit 1 comprises on the same support at least one data processing unit, such as a microcontroller MC, connectors 2, a first control member 3a sensitive to contact, a second control member 3b sensitive to contact, a first control state visualization member 4a and a second control state visualization member 4b. Said unit is a local unit integrated in the control device. The computing circuit 1 also comprises a memory which can be included in the processing unit.

The first control member 3a sensitive to contact and the second control member 3b sensitive to contact are preferably two distinct buttons sensitive to contact, able to activate two different control functions.

Each control member 3a sensitive to contact and each second control member 3b is able to replace a known pushbutton switch.

The first control state visualization member 4a and the second control state visualization member 4b are preferably two activation indicators providing the visualization of the control state of the control member 3a sensitive to contact and the second control member 3b sensitive to contact, respectively.

A front face 5 comprises a rigid frame 5a bounding off two flexible support zones.

A first flexible support zone has a pictogram 6a with backlighting and a translucent window 7a placed on top of it with the first control state visualization member 4a, to allow the operator to know the control state of the control member 3a sensitive to contact.

A second flexible support zone has a pictogram 6b with backlighting and a translucent window 7b placed on top of it with the second control state visualization member 4b, to allow the operator to know the control state of the second control state visualization member 4b sensitive to contact.

A mounting box 8 for the computing circuit 1 and the front face 5 comprises openings 9 for the connectors 2 to pass through.

The assembly after mounting of the computing circuit 1 and the front face 5 in the mounting box 8 is done in a tight manner, for example, by ultrasound welding, to end up with the assembled device 10 of FIG. 2.

By choosing dimensions of the device which are identical or close to those of the toggle switches of the prior art, the invention makes it possible to double the control possibilities in the same footprint, given that the space corresponding to one toggle switch is used for two distinct support zones.

After the assembly is complete, a unique and definitive programming of the device is done according to the pictograms of the front faces 5.

This unique and definitive programming of the device involves at least the assigning of a unique identifier for the device and the storing of this unique identifier of the device in the microcontroller MC.

The invention thus allows a better management of the stock of elements making up the device for controlling industrial or all-terrain vehicle functions by electing to mark the front faces 5 with pictograms depending on the effective commands, and then to assemble the corresponding front faces 5 to form the control devices according to the invention before programming them.

Figure 3:
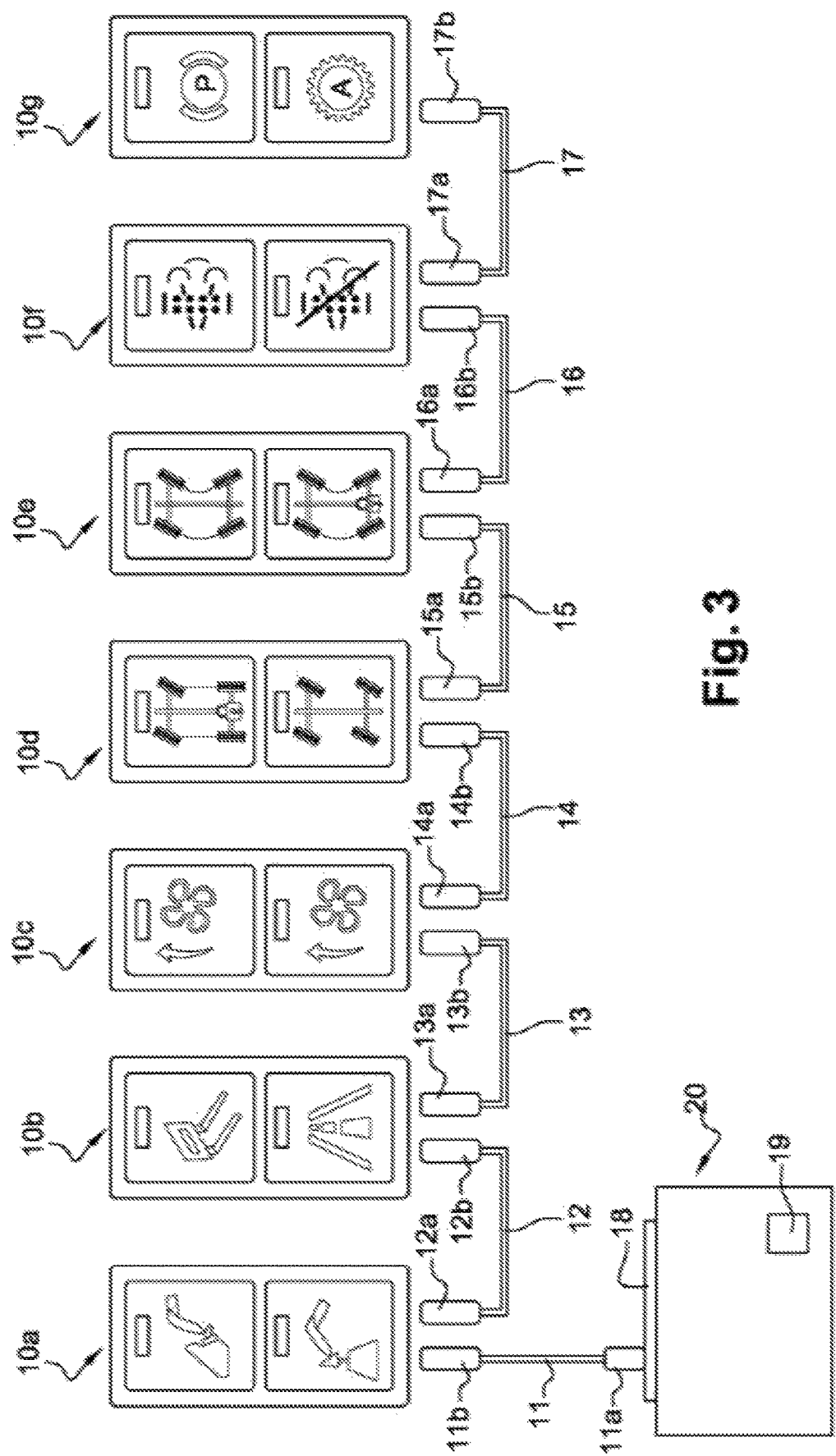
FIG. 3 shows schematically a physical architecture of a system comprising a chain of devices for controlling industrial or all-terrain vehicle functions according to FIG. 1 or FIG. 2.

Making reference to FIG. 3, a system for controlling industrial or all-terrain vehicle functions comprises a chain of devices for controlling industrial or all-terrain vehicle functions connected to a central processing unit 20 or equivalent computer. The central unit has in its memory the unique identifiers of the chain of control devices with which the central unit is configured to communicate.

In this example, the central processing unit 20 is produced as an electronic circuit card used for the configuration of a concatenated network.

The network to which the control devices 10a to 10g care connected comprises a certain number of links 11 to 17, symbolized by cables.

This network is preferably a distributed intelligence network, such as a network made up of links 11 to 17 connecting the printed circuits of control devices 10a to 10g.

The links 11 to 17 connecting the printed circuits of the control devices 10a to 10g each comprising a microcontroller MC are terminated respectively by connectors 11a, 11b; 12a, 12b; 13a, 13b; 14a, 14b; 15a, 15b; 16a, 16b and 17a, 17b.

The connectors 11b; 12a, 12b; 13a, 13b; 14a, 14b; 15a, 15b; 16a, 16b and 17a, 17b are fitted to the connectors 2 of the printed circuits of the control devices 10a to 10g.

The invention likewise covers the case when a network of this kind is chosen in a group of wireline or wireless networks enabling various types of physical linkage: twisted pairs, carrier current, radio frequency, infrared, coaxial cable, or optical fiber.

Network links situated at the control device 10g can be provided for or added in supplemental manner to the connection of other control devices.

The advantage of this type of network is the use of a communication protocol according to the seven-layer OST model, known to computer technicians.

The linking means 11 to 17 can be replaced or exchanged according to the specifications for control of functions or particular control sequences for certain functions.

One particularity of the invention is the fact that it does not take account of the physical location of the control devices 10a to 10g, but instead is oriented entirely to the cyclical communication and temporary memorization of the control states of industrial or all-terrain vehicle functions in order to provide an overall evaluation of the industrial or all-terrain vehicle functions.

This approach makes it possible to limit the amount of control polling to be effected.

The control devices 10a to 10g are connected in a chain to the computer 20 by connecting the connector 11a to the terminal 18 of the computer 20.

Since the computer 20 is the master of the communication chain, the computer 20 polls each of the control devices 10a to 10g one by one, thanks to their unique identifier.

The computer 20 issues a polling order addressed to each control device 10a to 10g in order to obtain an information feedback from each corresponding microcontroller MC.

This feedback information indicates the state of activation of the high and low zones of the control devices 10a to 10g and the consistency of the indications furnished by the two activation indicators 4a, 4b, ensuring respectively the visualization of the control state of the control member 3a sensitive to contact and of the second control member 3b sensitive to contact.

For each device 10a to 10g, the computer thus requests the state of the two activation indicators, ensuring respectively the visualization of the control state of the control member 3a sensitive to contact and of the second control member 3b sensitive to contact.

The computer repeats these operations in a continuous cycle.

The invention thus makes it possible to obtain complete and unequivocal information as to the state of the vehicle and an indication of the performance and characteristics demanded by the operator of the industrial or all-terrain vehicle.

The invention described in regard to a system for controlling of industrial or all-terrain vehicle functions is in no way limited to this embodiment, but also extends to all types of control systems for equivalent functions.

The personalization and identification of the system for controlling vehicle functions therefore means that the vehicle may be considered as a whole by the system as being a master peripheral, simply identified by a general memory and a microprocessor 19.

This general memory and this microprocessor 19 can be associated with a communication address and a memory address.

The system attached to the vehicle can be unique or backed up for security on a portable device, if the owner of the vehicle or the driver so desires.

In this case, each system for controlling functions preferably receives information simultaneously with the receiving of information by the other system, but the command orders can only be given, however, by the control of functions on a single system for which the transmission and the reception are fully authorized for the controlling of functions, so that the reception is fully authorized and the transmission is limited by the other system.

The functions and steps described above can be implemented in the form of a computer program or via hardware (such as programmable gate arrays). In particular, the functions and steps performed by the processing means or units can be realized by sets of computer instructions implemented in a processor or controller or they can be realized by dedicated electronic components or components of FPGA or ASIC type. It is also possible to combine computer portions and electronic portions.

The computer programs, or computer instructions, can be contained in program storage devices, such as digital data storage media readable by computer, or executable programs. The programs or instructions can also be executed from program storage peripherals.

The invention is not limited to the embodiments illustrated in the drawings. Consequently, it should be understood that when the characteristics mentioned in the appended claims are followed by reference markings, these markings are included solely for the purpose of improving the comprehension of the claims and are in no way limiting to the scope of the claims.

Moreover, the term "comprising" does not exclude other elements or steps. Furthermore, characteristics or steps which have been described in regard to one of the embodiments explained above can likewise be used in combination with other characteristics or steps of other embodiments explained above.

The invention claimed is:

1. An industrial or all-terrain vehicle having a control system for controlling functions of said industrial or all-terrain vehicle, wherein said control system comprises:
   data processing means,
   a plurality of control devices for controlling functions of said industrial or all-terrain vehicle, said control devices being arranged with said data processing means in a network, inside said industrial or all-terrain vehicle, according to a master-slave model, and
   each control device for controlling functions of said industrial or all-terrain vehicle comprises in combination:
   at least a first control member sensitive to contact and connectors,
   a computing circuit with at least one data processing unit, and a memory in which is stored a unique identifier associated with said control device, wherein said at least one data processing unit of each control device comprises at least one printed circuit, and
   at least a first control state visualization member, and said data processing means are configured to transmit to each control device, identified by the unique identifier of said control device, a request to obtain a feedback of information from said at least one data processing unit of said control device, and
   wherein said control system comprises links configured to:
   interconnect the printed circuits of the control devices in order to form a chain of control devices, wherein the position of each control device in the chain of control devices is modifiable, and
   connect said data processing means to said chain of control devices;
   said links each having terminations comprising connectors fitted to connectors of the printed circuits of the control devices,
   wherein the control devices are configured so that the positions of said control devices inside the vehicle are interchangeable one with another.

2. The industrial or all-terrain vehicle as claimed in claim 1, wherein said data processing means are configured to transmit said request one by one to each control device.

3. The industrial or all-terrain vehicle as claimed in claim 2, wherein said data processing means are configured to transmit said request to each control device in a continuous cycle.

4. The industrial or all-terrain vehicle as claimed in claim 1, wherein said feedback information comprises at least one of the control state of said at least one first control member sensitive to contact and/or the consistency of the state of said at least one first control state visualization member with the control state of said at least one first control member sensitive to contact.

5. The industrial or all-terrain vehicle as claimed in claim 4, wherein said feedback information comprises the state of said at least one first control state visualization member.

6. The industrial or all-terrain vehicle as claimed in claim 1, wherein the computing circuit of each control device comprises on a same support at least said at least one data processing unit, the connectors, the at least one first control member sensitive to contact, a second control member sensitive to contact, the at least one first control state visualization member and a second control state visualization member.

7. The industrial or all-terrain vehicle as claimed in claim 1, wherein each control device comprises a front face with a rigid frame bounding off at least one flexible support zone.

8. The industrial or all-terrain vehicle as claimed in claim 1, wherein each control device comprises a first flexible support zone having a pictogram with backlighting and a translucent window placed on top of said first flexible support zone with the at least one first control state visualization member, to allow the operator to know the control state of said at least one first control member sensitive to contact.

9. The industrial or all-terrain vehicle as claimed in claim 8, wherein each control device further comprises a second flexible support zone having a pictogram with backlighting and a translucent window placed on top of said second flexible support zone with a second control state visualization member, to allow the operator to know the control state of a second control state visualization member sensitive to contact.

10. The industrial or all-terrain vehicle as claimed in claim 1, wherein each control device comprises a mounting box for the computing circuit and a front face and in that the mounting box comprises openings for the connectors to pass through.

11. A method to fabricate an industrial or all-terrain vehicle as claimed in claim 1, wherein each control device is fabricated by mounting of the computing circuit and a front face in a mounting box and by tight assembly by ultrasound welding.

* * * * *